United States Patent
Eisele et al.

(10) Patent No.: US 12,105,618 B2
(45) Date of Patent: Oct. 1, 2024

(54) METHOD FOR FUZZ TESTING

(71) Applicant: Robert Bosch GmbH, Stuttgart (DE)

(72) Inventors: Max Camillo Eisele, Ludwigsburg (DE); Christopher Huth, Heilbronn (DE); Irina Nicolae, Stuttgart (DE)

(73) Assignee: ROBERT BOSCH GMBH

(*) Notice: Subject to any disclaimer, the term of this patent is extended or adjusted under 35 U.S.C. 154(b) by 175 days.

(21) Appl. No.: 18/052,149

(22) Filed: Nov. 2, 2022

(65) Prior Publication Data
US 2023/0205677 A1    Jun. 29, 2023

(30) Foreign Application Priority Data
Nov. 10, 2021 (DE) .................... 10 2021 212 663.4

(51) Int. Cl.
*G06F 11/36* (2006.01)
(52) U.S. Cl.
CPC ............................. *G06F 11/3684* (2013.01)
(58) Field of Classification Search
CPC ............ G06F 11/3684; G06F 11/3688; G06F 11/141; G06F 11/349; G06F 11/05; G06N 20/00; G06N 7/023
See application file for complete search history.

(56) References Cited

U.S. PATENT DOCUMENTS 10,599,558 B1 * 3/2020 Zana ..................... G06F 11/302
11,868,238 B2 * 1/2024 Wu ..................... G06F 11/3684

FOREIGN PATENT DOCUMENTS

DE    102019211037 A1    1/2021

OTHER PUBLICATIONS

Rahul Krishma et al.; MTFuzz: Fuzzing with a Multi-task Neural Network; ACM; pp. 737-749; retrieved on Mar. 7, 2024 (Year: 2020).*
Nicolas Coppik et al.; MemFuzz: Using Memory Accesses to Guide Fuzzing; IEEE; pp. 48-58; retrieved on Mar. 7, 2024 (Year: 2019).*
She et al., "Neuzz: Efficient Fuzzing With Neural Program Smoothing," 40 th IEEE Symposium on Security and Privacy (SP), 2019, pp. 1-15. https://arxiv.org/pdf/1807.05620.pdf> Downloaded Nov. 2, 2022.
Duchi et al., "Adaptive Subgradient Methods for Online Learning and Stochastic Optimization," Journal of Machine Learning Research, vol. 12, 2011, pp. 1-39. <https://jmlr.org/papers/volume12/duchi11a/duchi11a.pdf> Downloaded Nov. 2, 2022.
Kingma et al., "Adam: A Method for Stochastic Optimization," Cornell University, 2017, pp. 1-15.

* cited by examiner

Primary Examiner — S. Sough
Assistant Examiner — Cuong V Luu
(74) Attorney, Agent, or Firm — NORTON ROSE FULBRIGHT US LLP; Gerard A. Messina

(57) ABSTRACT

A computer-implemented method for fuzzing a target software running on a computer. In the method: a target program is carried using first input data, memory context information of the target program's run is captured, a machine learning model is trained using the first input data and the memory context information as model input, a fuzzing input is generated based on an output of the machine learning model, the target program is tested using the fuzzing input.

9 Claims, 2 Drawing Sheets

METHOD FOR FUZZ TESTING

CROSS REFERENCE

The present application claims the benefit under 35 U.S.C. § 119 of German Patent Application No. DE 10 2021 212 663.4 filed Nov. 10, 2021, which is expressly incorporated herein by reference in its entirety.

FIELD

The present invention relates to computer-implemented methods for fuzzing a target software, a corresponding computer program as well as a corresponding fuzzing system.

BACKGROUND INFORMATION

In German Patent Application No. DE 10 2021 207 248, a method for systematic multi-Process interface fuzzing is described. German Patent Application No. DE 10 2019 211 037 describes a method for efficient combination of dynamic and static analyses of systems.

In "NEUZZ: Efficient Fuzzing with Neural Program Smoothing", D. She, K. Pei, D. Epstein, J. Yang, B. Ray and S. Jana, 2019 IEEE Symposium on Security and Privacy (SP), 2019, pp. 803-817, doi: 10.1109/SP.2019.00052, existing fuzzing techniques are improvided by including machine learning (ML). As described in the paper, thee gradient-guided fuzzing method, called NEUZZ, is especially successful when complex input formats need to be discovered. Solving those high-dimensional structured optimization problems is still an open issue, but NEUZZ seems to be better than state-of-the-art fuzzers.

NEUZZ relies on the following idea: a neural network is trained to serve as a smooth approximation of the original program in terms of code coverage, which can then be used to propose program inputs that reach different regions of the code. NEUZZ represents the different path coverages from each individual program input of the target program as binary vectors. Elements in coverage vectors that are consistently zero represent code branches that are never reached, which we want to discover through fuzzing. The neural network trained by NEUZZ is a smooth approximation of the target program in terms of code coverage. This model is used to solve an optimization problem that produces inputs capable of reaching uncovered branches.

SUMMARY

A computer-implemented method for fuzzing a target software running on a computer in provided according to the present invention. According to an example embodiment of the present invention, in the method:
- a target software (computer program) is carried using first input data,
- memory context information of the target program's run is captured,
- a machine learning model is trained using the first input data and the memory context information as model input,
- a fuzzing input is generated based on an output of the machine learning model,
- the target program is tested using the fuzzing input.

The methods according to an example embodiment of the present invention make use of memory context to support machine-learning-guided fuzzing towards test effectiveness (finding more bugs) and efficiency (usage of test time). Memory context information enriches machine-learning-supported fuzzing to generate better inputs in less tries, especially for stateful, slow, or embedded software.

In preferable embodiments of the present invention, the machine learning model is trained using supervised training.

The machine learning model can for example be realized as a neural network or using support vector machines. The machine learning model can be retrained based on the fuzzing input and on memory context information of the test of the target program using the fuzzing input.

Our provided method according to an example embodiment of the present invention addresses downsides of plain coverage guided fuzzing as well as downsides of the NEUZZ method introduced above.

Plain coverage guided fuzzing downsides:

Fuzzing relies on fast execution of the target binary and compensates unawareness of the target by trying tons of different inputs. However, for slow targets, a more intelligent creation of inputs is needed.

For targets that are stateful, plain fuzzing becomes inefficient. If the fuzzer is not aware of the current state of the target, even identical inputs can trigger different behaviors. The target does not act deterministic to the fuzzer.

NEUZZ downsides:

NEUZZ relies on edge coverage to train its model and to improve the fuzzing process. This does not work for stateful software, as edge paths for stateful software can be infinite or indistinguishable for different states.

While NEUZZ tries to trigger different behavior regarding the edge coverage, our proposal triggers different behaviors based on memory accesses. Thereby, the state of the software is learned intrinsically, by observing all memory accesses during execution.

As NEUZZ works alongside AFL, it has the same downsides when it comes to embedded software. Target software is only fuzzable on e.g. an x86 architecture. Porting embedded software into a fuzz testable state is still an open problem. Our approach can work with memory snapshots or diffs of memory snapshots, which can be obtained from embedded devices easily.

In preferred embodiments of the present invention, the fuzzing input is generated based on the output of the machine learning algorithm by an optimization algorithm in order to achieve specific memory states or memory accesses of the target program. The memory context information can comprise at least one of a memory state information, a memory access information, information on memory operations during the execution of the program, a snapshot of the whole memory after the processing of data or a sequence of memory snapshots.

Example embodiments of the present invention are explained with reference to the figures.

DETAILED DESCRIPTION OF EXAMPLE EMBODIMENTS

Figure 1:
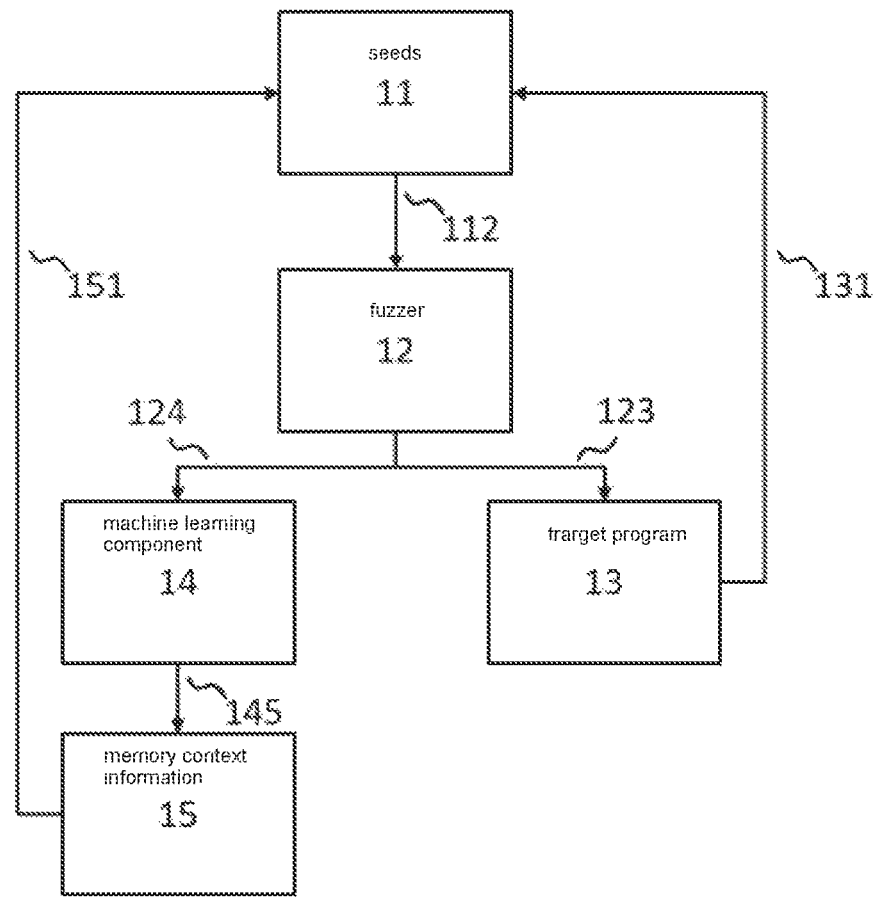
FIG. 1 schematically shows the exemplary setup of a fuzz testing system, according to an example embodiment of the present invention.

This present invention relates to a fuzz testing method and system using machine learning to include memory context information in the generation of input data for fuzzing a target software.

Fuzzing or fuzz testing is an automated software testing technique that involves providing invalid, unexpected, or random data as inputs to a target computer program and monitoring its reaction, e.g. whether the software crashes or fails built-in code assertions.

The programs that automatically generate inputs are called fuzzers or fuzz engines. They are commonly developed to test any software under test generically. They usually have the capabilities to instrument code, generate test cases and run programs under test. Popular examples are afl and libfuzzer.

The software program or function that is intended to be tested via fuzzing is called fuzz target. A main characteristic of a fuzz target should be that it consumes potential untrusted input, which will be generated by the fuzzer during the fuzzing process. Often, the fuzz targets take structured inputs, e.g. specified in a file format. Therefore, the input created by the fuzzer should be created in a way that they are accepted by the parser but still test corner cases or lead to surprising behavior by the target.

The combined version of a fuzzer and a fuzz target is called fuzz test. A fuzz target can then be instrumented code with a fuzzer attached to its inputs. A fuzz test is executable. The fuzzer can also start, observe, and stop multiple running fuzz tests (usually hundreds or thousands per second), each with a slightly different input generated by the fuzzer.

One specific input and test run from a fuzz test is called test case. Usually for reproducibility, interesting runs (finding new code paths or crashes) are saved. That way a specific test case, with its corresponding input, can also be run on a fuzz target, which is not connected to a fuzzer, i.e. in its release version.

There are various options to realize efficient fuzzing:
Instructions can be inserted into a program in order to generate feedback from the execution (static instrumentation). This can be realized by the compiler and can, for instance, describe the reached code blocks during execution.
The execution of a program can be controlled during runtime in order to generate feedback from the execution (dynamic instrumentation). It is mostly realized by operating system functionalities or by using emulators.
Code coverage information can be used as feedback during fuzzing, in order to detect if an input caused the execution of new code paths/blocks (coverage-guided fuzzing).
New inputs can be created by using a set of known inputs (corpus) and randomly applying mutations to them (mutation-based fuzzing).
New inputs can be created from scratch for instance by using input models or input grammars (generation-based fuzzing).

State of the Art Fuzzers like AFL, Honggfuzz, or Libfuzzer provide mutation-based, coverage-guided fuzzing to test software. Thereby, each round a seed input is picked from the input corpus, randomly mutated, and sent to the target program. When the newly generated input triggered previously unseen behavior (like new executed code paths), it gets added to the input corpus. This way, a program's input space can be explored with little to no knowledge about the input format.

FIG. 1 schematically shows the exemplary setup of a fuzz testing system, whereas the fuzzing system is extended with a machine learning algorithm (model), and it is enhanced by additionally receiving memory context.

Memory context information can be, for instance:
a list of all memory operations during the execution of the program (memory address, size, read or write),
a snapshot of the whole memory after the processing of data (preferably for devices with small internal RAM),
a sequence of memory snapshots respectively to a series of inputs (input sequence).

While a list of memory operations can be retrieved for typical user applications, the snapshot mechanism is intended to work for embedded devices with a small amount of internal memory, where the snapshot can be retrieved by a debugging connection. For preferred embodiments it can be irrelevant how the memory context data is retrieved and represented, as long as the machine learning model can derive behavior from it.

A typical fuzzing setup, comprised of seeds 11, a fuzzer 12, and a target program 13, is extended with a machine learning component 14.

Seeds 11 are selected and transferred as selected seeds (112) to fuzzer 12. Fuzzer 12 selects a test input. The selected test input is transferred as input to machine learning component 14 (124) and transferred as input to target program 13 (123).

The machine learning component 14 comprises a machine learning model or algorithm which mimics or describes an aspect of the target program. The aspect considered, especially memory context information 15, will be used as guiding feedback in the fuzzing loop. The machine learning model 14 predicts and outputs (145) memory context information 15.

In the next iteration of the fuzzing loop, the machine learning feedback 151 and the execution feedback 131 are used to generate further seeds 11.

In one preferred embodiment, the guiding strategy relies on memory access information for the target. The machine learning algorithm is trained per target program with the end goal of using it to generate new promising program inputs to be explored in the fuzzing process.

An embodiment of the corresponding fuzzing method comprises three steps:
1. Data Collection for Model Training (Optional)

This step aims to collect data about the target program that can be used to train a machine learning model. Program inputs are fed to the target program and its memory accesses or states are observed and recorded for each input.

This step is optional, as the users might already have available data.

2. Model Training

A machine learning model is trained in a supervised setup based on the collected data: (a) pairs of corresponding program inputs and (b) the program's response to the input in terms of memory access or states. Any kind of machine learning model that supports gradient methods and works for supervised tasks can be used, e.g. neural networks or support vector machines.

The model takes as input the same format as the target program. Based on that, the model is trained to predict the memory accesses the target program would make for each given input. Once trained, the machine learning model is able to predict memory accesses for a target program input without having to run the program. In this sense, the model acts as an oracle for memory accesses of the target program.

3. Program Input Generation

The generation of interesting inputs for the fuzzing process makes use of the trained model and tries to answer the question: how should a given program input be changed so that its predicted memory accesses change in a specific way? In practice, this question is answered by solving an optimization problem. The oracle trained in the previous step is essential for the resolution of the optimization problem, as it represents a differentiable approximation of the target program, which itself is not differentiable. A wide range of optimization algorithms can be used to compute a modified version of the input that produces certain memory states or accesses interesting for fuzzing. These include, and are not limited to, stochastic gradient descent, AdaGrad [Duchi et al., "Adaptive Subgradient Methods for Online Learning and Stochastic Optimization," Conference on Learning Theory, 2010], RMSProp [Hinton, G., Unpublished: accessed Nov. 8, 2021] and their more recent counterpart Adam [Kingma, D. P. & Ba, J., "Adam: A Method for Stochastic Optimization." International Conference for Learning Representations, 2015]. In practice, Adam usually performs best, as it leverages first and second order moments.

The three previous steps can be performed once or multiple times, retraining the model from scratch as more data becomes available for training. Alternatively, an online learning approach can be implemented, where the machine learning model is refined with the feedback from inputs it has generated that did not reach the predicted memory state goal. This latter approach allows to explicitly account and correct any blind spots that the machine learning model might have.

Figure 2:
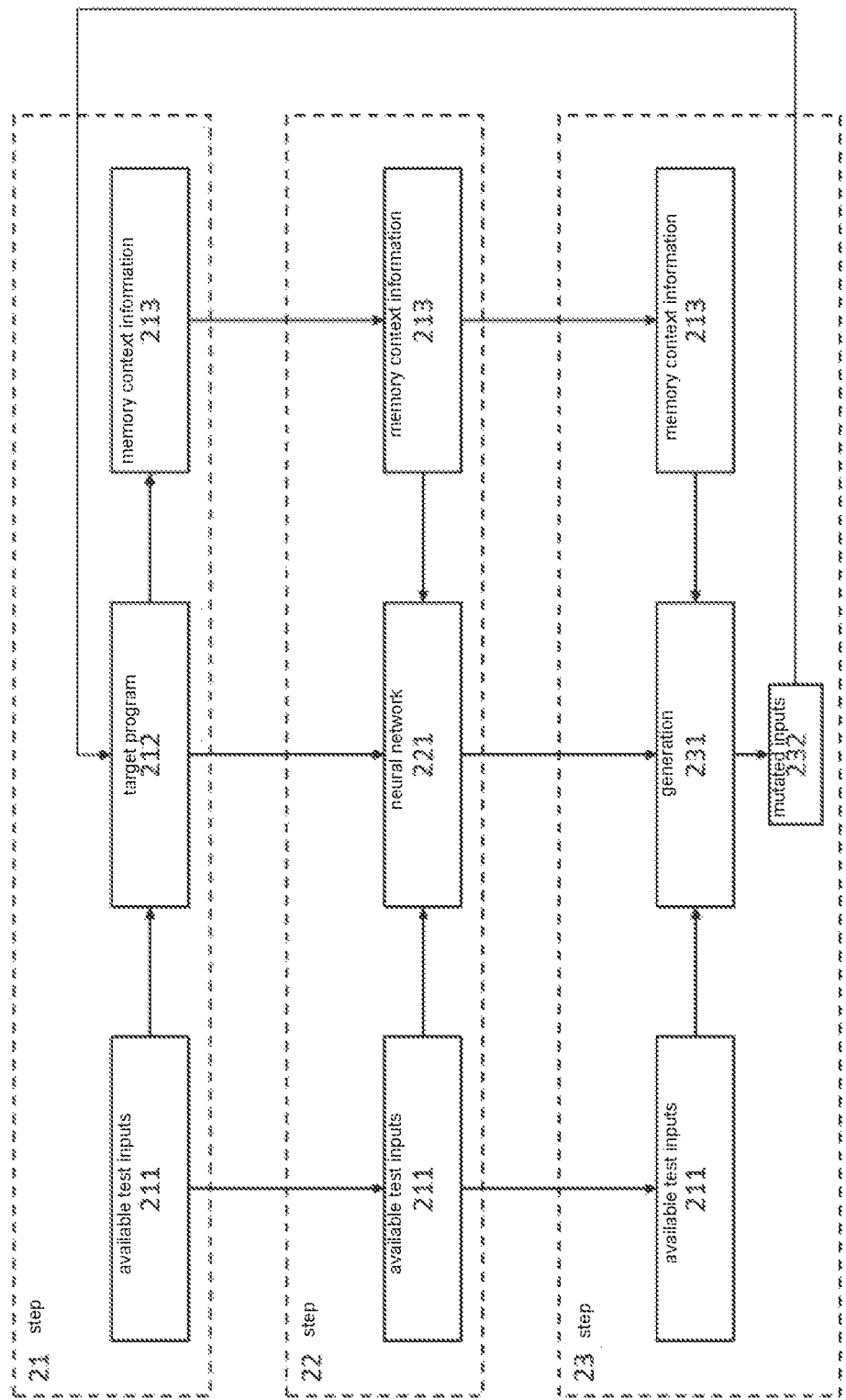
FIG. 2 schematically shows an exemplary flowchart corresponding to a preffered embodiment of the provided fuzzing methods, according to the present invention.

FIG. 2 schematically shows an exemplary flowchart corresponding to a preferred embodiment of the proposed fuzzing methods.

In this example, the trained model is a neural network, and the optimization method used to generate improved program inputs is standard gradient descent. The neural network is retrained periodically in this example, in order to benefit from the latest feedback produced by the fuzzer.

In a first step 21, training data is generated to be used for the machine learning algorithm by executing target program 212 with all available test inputs 211 while recording the desired memory context information 213.

In a second step 22, a neural network 221 chosen in this example as machine learning model is trained using input 211 as well as the corresponding memory context information 213 as inputs.

In a third step 23, an output of neural network 221 as well as its inputs are used for a generation 231 of mutated inputs 232 for further fuzzing.

For the generation 231 of mutated inputs 232, memory accesses are selected from memory context information 213. For those memory accesses gradients are computed with respect to input 211. Using those computations, locations with the steepest gradients are chosen. For those chosen locations, mutations are applied, generating a set of mutated inputs 232.

Since in this example the training of the machine learning algorithm comprises a periodic retraining, the set of mutated inputs 231 is again used in step 21 as input 211, used for testing target program 212 and generating further training data 211 and 213.

This method enables to generate new test inputs with a high probability of triggering a different memory behavior based on the memory behavior of previous test inputs. This is especially useful when other behavior feedback, like code-coverage cannot be retrieved from the target, especially for embedded software or stateful software. For instance, generating code-coverage from an embedded system is an open research area, while doing a memory snapshot can be done through a debugging connection.

What is claimed is:

1. A computer-implemented method for fuzzing a target software running on a computer, the method comprising the following steps:
   executing a target program using first input data;
   capturing memory context information of a run of the target program;
   training a machine learning model using the first input data and the memory context information as model input;
   generating a fuzzing input based on an output of the machine learning model; and
   testing the target program using the fuzzing input.

2. The method according to claim 1, wherein the fuzzing input is generated based on the output of the machine learning model by an optimization algorithm to achieve specific memory states or memory accesses of the target program.

3. The method according to claim 1, wherein the machine learning model is retrained based on the fuzzing input and on memory context information of the testing of the target program using the fuzzing input.

4. The method according to claim 1, wherein the memory context information includes at least one of: (i) a memory state information, (ii) a memory access information, (iii) information on memory operations during the execution of the target program, (iv) a snapshot of whole memory after processing of data, or (v) a sequence of memory snapshots.

5. The method according to claim 1, wherein the machine learning model is trained using supervised training.

6. The method according to claim 1, wherein the machine learning model is a neural network or support vector machines.

7. The method according to claim 2, wherein the optimization algorithm is a gradient descent method.

8. A non-transitory computer-readable medium storing a computer program for fuzzing a target software running on a computer, the computer program, when executed by a computer, causes the computer to perform the following steps:
   executing a target program using first input data;
   capturing memory context information of a run of the target program;
   training a machine learning model using the first input data and the memory context information as model input;
   generating a fuzzing input based on an output of the machine learning model; and
   testing the target program using the fuzzing input.

9. A fuzz testing system, comprising:
   a computer configured to fuzz a target software, the computer configured to:
   execute a target program using first input data;
   capture memory context information of a run of the target program;
   train a machine learning model using the first input data and the memory context information as model input;
   generate a fuzzing input based on an output of the machine learning model; and test the target program using the fuzzing input.

* * * * *